US007386439B1

(12) United States Patent
Charnock et al.

(10) Patent No.: US 7,386,439 B1
(45) Date of Patent: Jun. 10, 2008

(54) DATA MINING BY RETRIEVING CAUSALLY-RELATED DOCUMENTS NOT INDIVIDUALLY SATISFYING SEARCH CRITERIA USED

(75) Inventors: Elizabeth Charnock, Foster City, CA (US); Steven L. Roberts, Foster City, CA (US); David J. Holsinger, Pescadero, CA (US); Roman V. Brouk, San Jose, CA (US)

(73) Assignee: Cataphora, Inc., Redwood City, CA (US)

( * ) Notice: Subject to any disclaimer, the term of this patent is extended or adjusted under 35 U.S.C. 154(b) by 866 days.

(21) Appl. No.: 10/358,793

(22) Filed: Feb. 4, 2003

(51) Int. Cl.
*G06F 17/30* (2006.01)
(52) U.S. Cl. .............................. 704/9; 707/1; 715/500
(58) Field of Classification Search ................ 704/3, 704/4; 715/530
See application file for complete search history.

(56) References Cited

U.S. PATENT DOCUMENTS

| | | | |
|---|---|---|---|
| 5,689,550 A | 11/1997 | Garson et al. | |
| 5,754,939 A | 5/1998 | Herz et al. | |
| 5,796,395 A | 8/1998 | de Hond | |
| 5,880,731 A | 3/1999 | Liles et al. | |
| 6,188,405 B1 | 2/2001 | Czerwinski et al. | |
| 6,209,100 B1 | 3/2001 | Robertson et al. | |
| 6,275,811 B1 | 8/2001 | Ginn | |
| 6,311,194 B1 | 10/2001 | Sheth et al. | |
| 6,381,579 B1 | 4/2002 | Gervais et al. | |
| 6,396,509 B1 | 5/2002 | Cheng | |
| 6,476,830 B1 | 11/2002 | Farmer et al. | |
| 6,484,196 B1 | 11/2002 | Maurille | |
| 6,539,421 B1 | 3/2003 | Appelman et al. | |
| 6,598,046 B1 | 7/2003 | Goldberg et al. | |
| 6,631,375 B2 | 10/2003 | Jecha et al. | |
| 6,654,726 B1 | 11/2003 | Hanzek | |
| 6,654,749 B1 * | 11/2003 | Nashed | 707/10 |
| 6,728,752 B1 | 4/2004 | Chen et al. | |
| 6,910,186 B2 | 6/2005 | Kim | |

(Continued)

FOREIGN PATENT DOCUMENTS

WO    WO 00/67159    11/2000

(Continued)

OTHER PUBLICATIONS

Wellman, Barry, "For a Social Network Analysis of Computer Networks: A Sociological Perspective on Collaborative Work and Virtual Community", 1996, ACM, p. 1-11.

(Continued)

*Primary Examiner*—Tālivaldis Ivars Šmits
(74) *Attorney, Agent, or Firm*—MacPherson Kwok Chen Heid LLP

(57) ABSTRACT

This patent describes a method and apparatus to automatically and accurately winnow down arbitrarily large amounts of electronic information created by a particular population of actors to only those subsets of particular interest by having a causal relationship, even when retrieved documents containing this information do not individually satisfy the search criteria used. An actor in this context is defined as any entity, single or aggregate, capable of creating, distributing, modifying, or receiving digital information. Once identified, this subset of information may, for example, be processed, analyzed, redacted, or destroyed, depending on the context of the system's use.

28 Claims, 8 Drawing Sheets

U.S. PATENT DOCUMENTS

| | | | |
|---|---|---|---|
| 2001/0018698 A1 | 8/2001 | Uchino | |
| 2001/0048449 A1 | 12/2001 | Baker | |
| 2002/0116470 A1* | 8/2002 | Dyer et al. | 709/217 |
| 2002/0161800 A1* | 10/2002 | Eld et al. | 707/512 |
| 2002/0194192 A1* | 12/2002 | Dietz | 707/104.1 |
| 2003/0115481 A1* | 6/2003 | Baird et al. | 713/201 |
| 2004/0205643 A1* | 10/2004 | Harrington | 715/530 |

FOREIGN PATENT DOCUMENTS

| | | |
|---|---|---|
| WO | WO 01/53995 A1 | 7/2001 |
| WO | WO 01/57633 A1 | 8/2001 |
| WO | WO 01/69428 A1 | 9/2001 |

OTHER PUBLICATIONS

ISR from PCT/US03/03504 date of mailing Apr. 21, 2003 (1 page).

ISR from PCT/US03/03309 date of mailing May 1, 2003 (1 page).

Song, W.W. et al, "A Semantic Similarity Approach to electronic document modeling and integration", Web Information Systems Engineering, 2000Proceedings of the first International conference on Hong Kong, China Jun. 19-21, 2000, Los Alamitos, CA, USA, IEEE Comput, Soc., US, vol. 1, Jun. 19, 2000, pp. 116-124, XP010521844 ISBN: 0-7695-0577-5.

Varlamis, I. et al. "Web document searching using enhanced flyperlink semantics based on xml" Database Engineering & Applications, 2001 International Symposium on Jul. 16-18, 2001, Piscataway, NJ, USA, IEEE, pp. 34-44, XP010554365.

Dunkel B. et al, "customized metadata for Intenet Information" Knowliedge-Based Intelligtne Electronic Systems, 1997. KES '97. Proceedings., 1997 First International COnference on Adelaide, SA Australia May 21-23, 1997, New York, NY, USA, IEEE US, vol.2, May 21, 1997, pp. 508-519, XP010242741, ISBN: 0-780-3755-7.

Katashi Nagao ED; Akito Sakurai et al, "Discussion Mining: Knowledge Discovery from Semantically Annotated Discussion Content"; New Frontiers in Atrificial Intelligence Lecture notes in COmputer Science; LNCS, Springer Berlin Heidelberg, BE, vol. 3609, 1900, pp. 158-168, XP019055847; ISBN: 978-3-540-71008-0.

Smith M A Et Al Association for Computing Machinery: "Visualization Components for Persistent Conversations" Chi 2001 Conference Proceedings. Conference on Human Factors in Computing Systems. Seattle, Wa, Mar. 31-Apr. 5, 2001, Chi Conference Proceedings. Human Factors in Computing Systems, New York, Ny: Ieee,US, Mar. 31, 2001 (Mar. 31, 2001), pp. 136-143, Isbn: 1-58113-327-B Abstract; Figures 3-6 p. 141-p. 143.

Warren Sack: "Conversation Map: A Content-Based Newsgroup Browser" Proceedings of The 5th International Conference on Intelligent User Interfaces, [Onl lne] 2000, pp. 233-240, New Orleans, Usa Isbn: 1-58113-134-8 Retrieved From the Internet: url: Http://Portal. Acm. Abstract* p. 234 [Retrieved p. 237 on Feb. 14, 2008].

Donath J Et Al: "Visualizing Conversation" Systems Sciences, 1999. Hicss-32. Proceedings of the 32nd Annual Hawaii International Conference on Maui, Hi, Usa Jan. 5-8. 1999, Los Alamitos, Ca, Usa, Ieee Comput. Soc, us, Jan. 5, 1999 (Jan. 05, 1999), pp. 1-9.

* cited by examiner

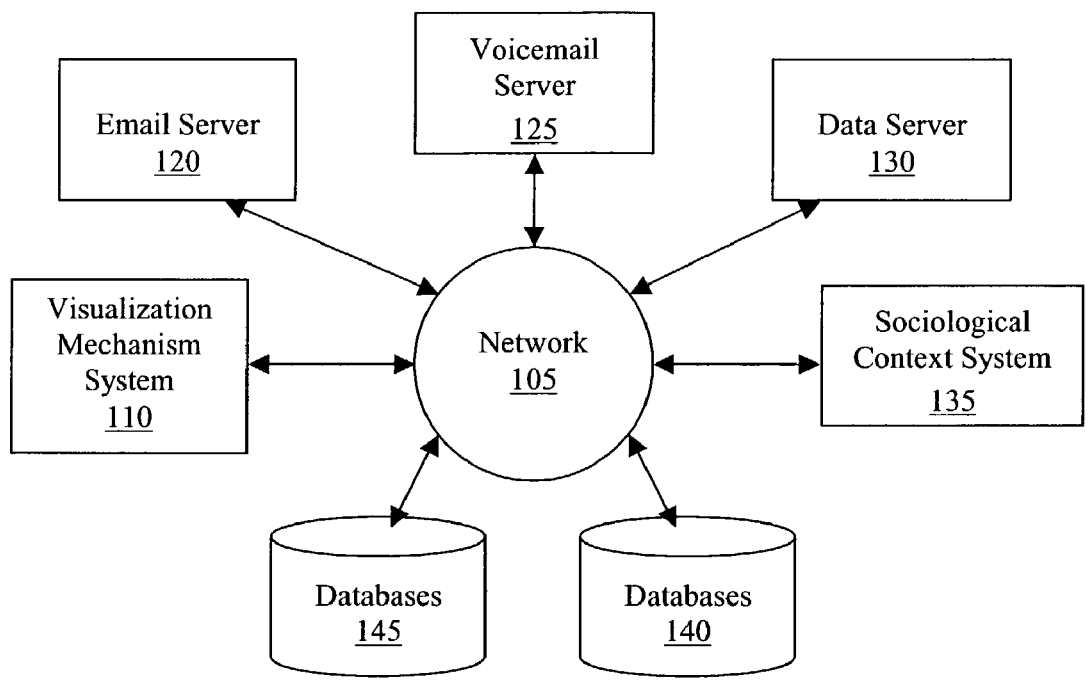
Figure 1: Example of a Computer Network

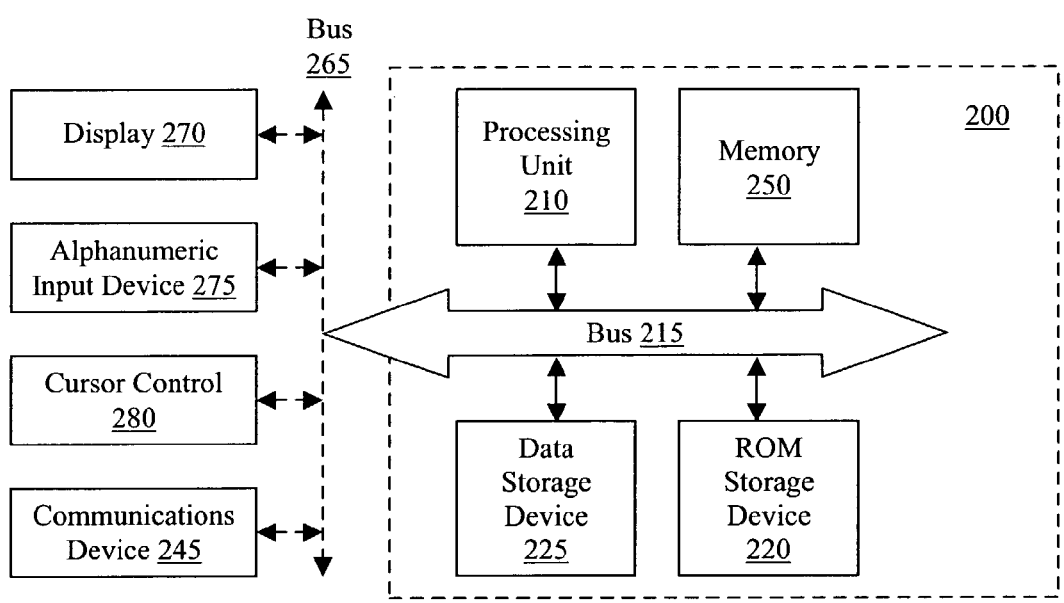
Figure 2: Example of a Digital Computer

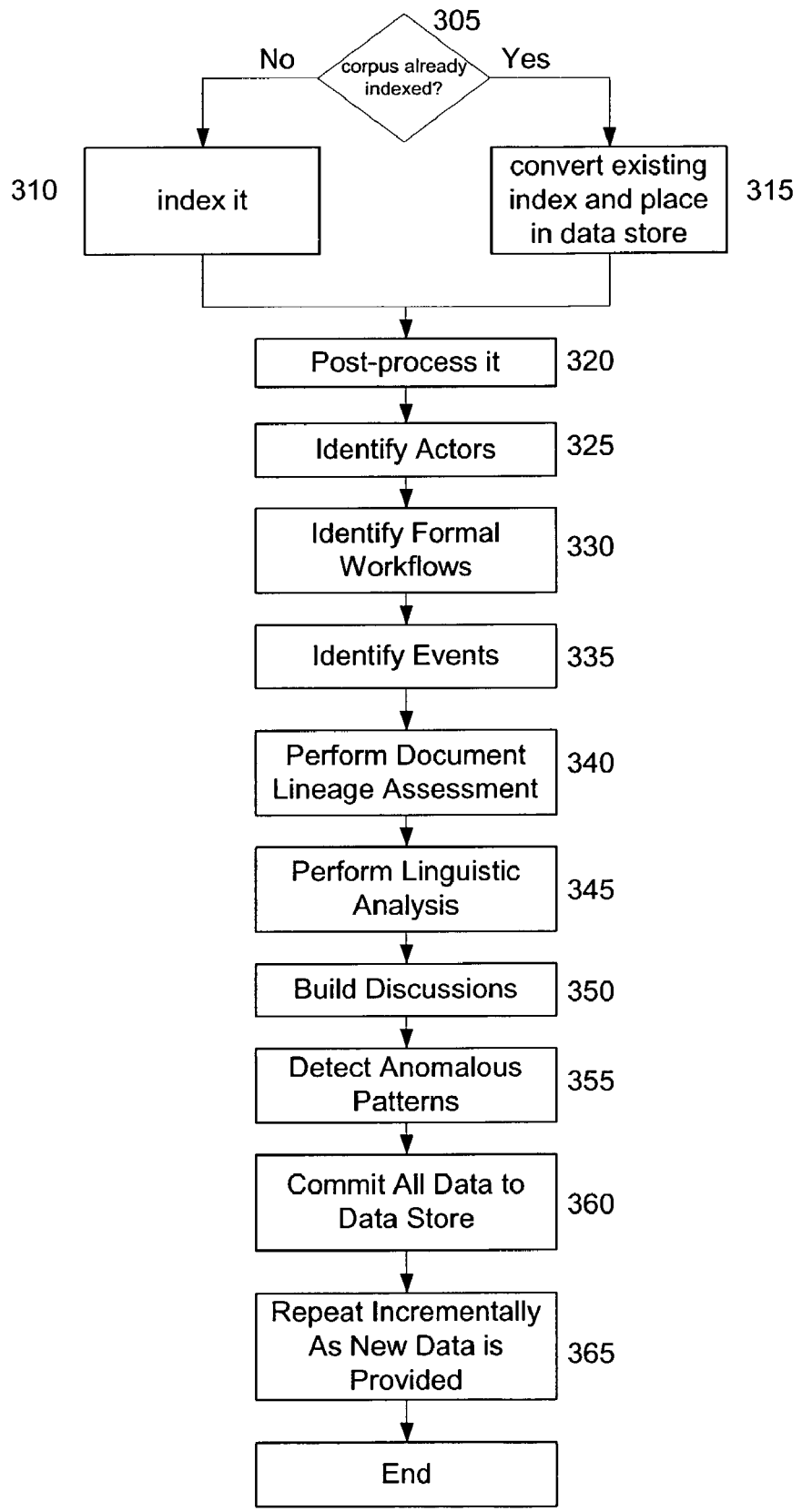
Figure 3: Discussion Building Engine Overview

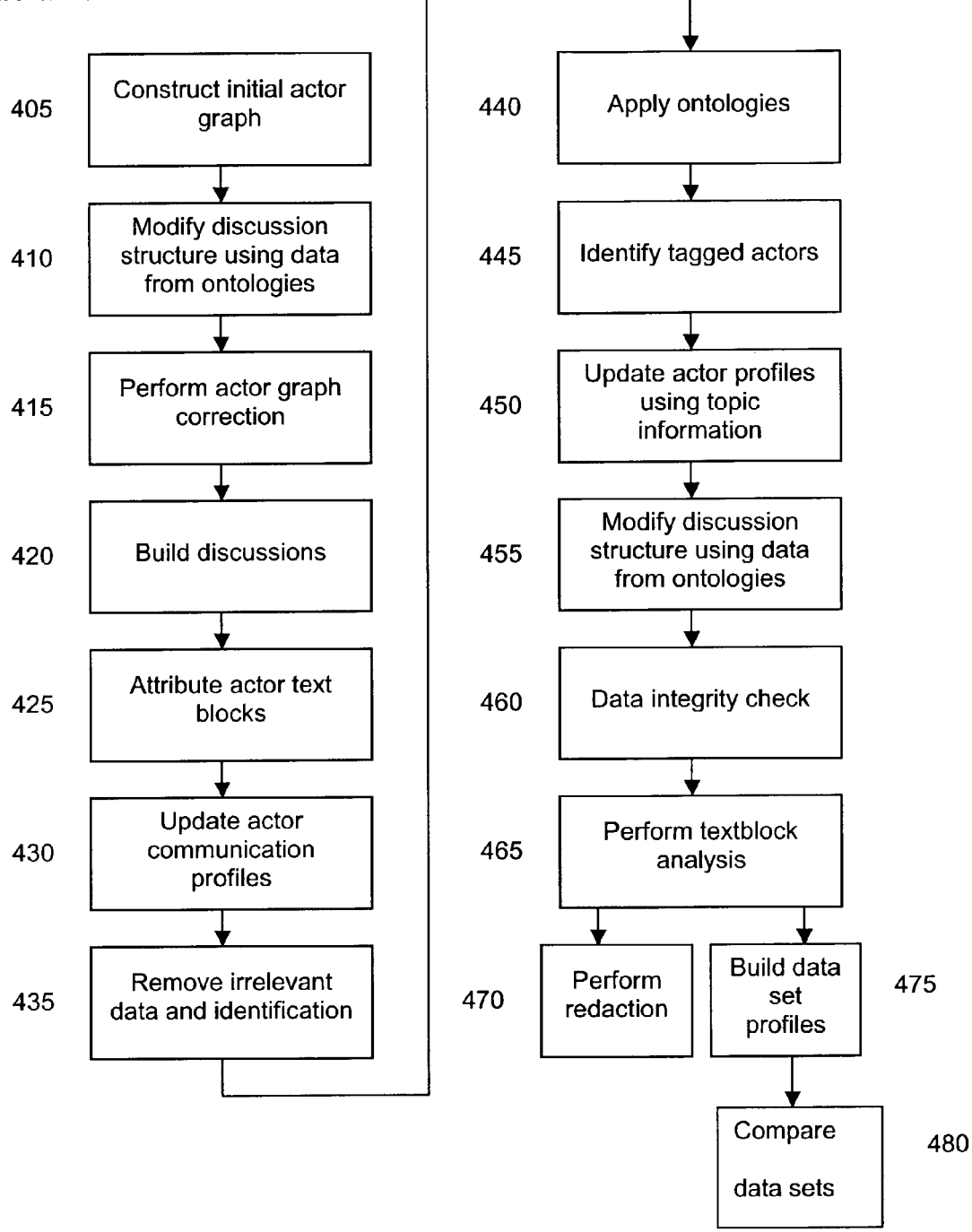

Figure 5: Initial Actor Graph, with Communications Weighting between Actors
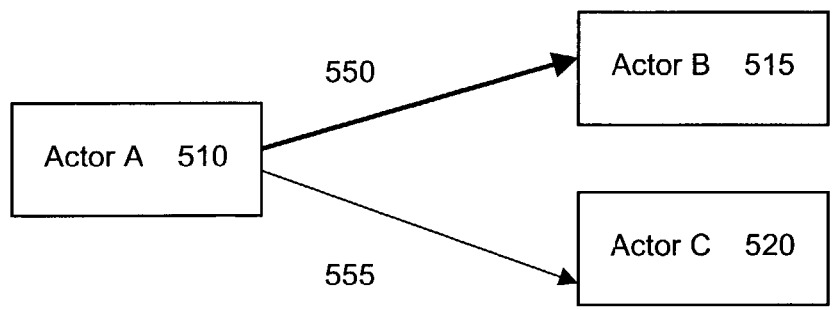

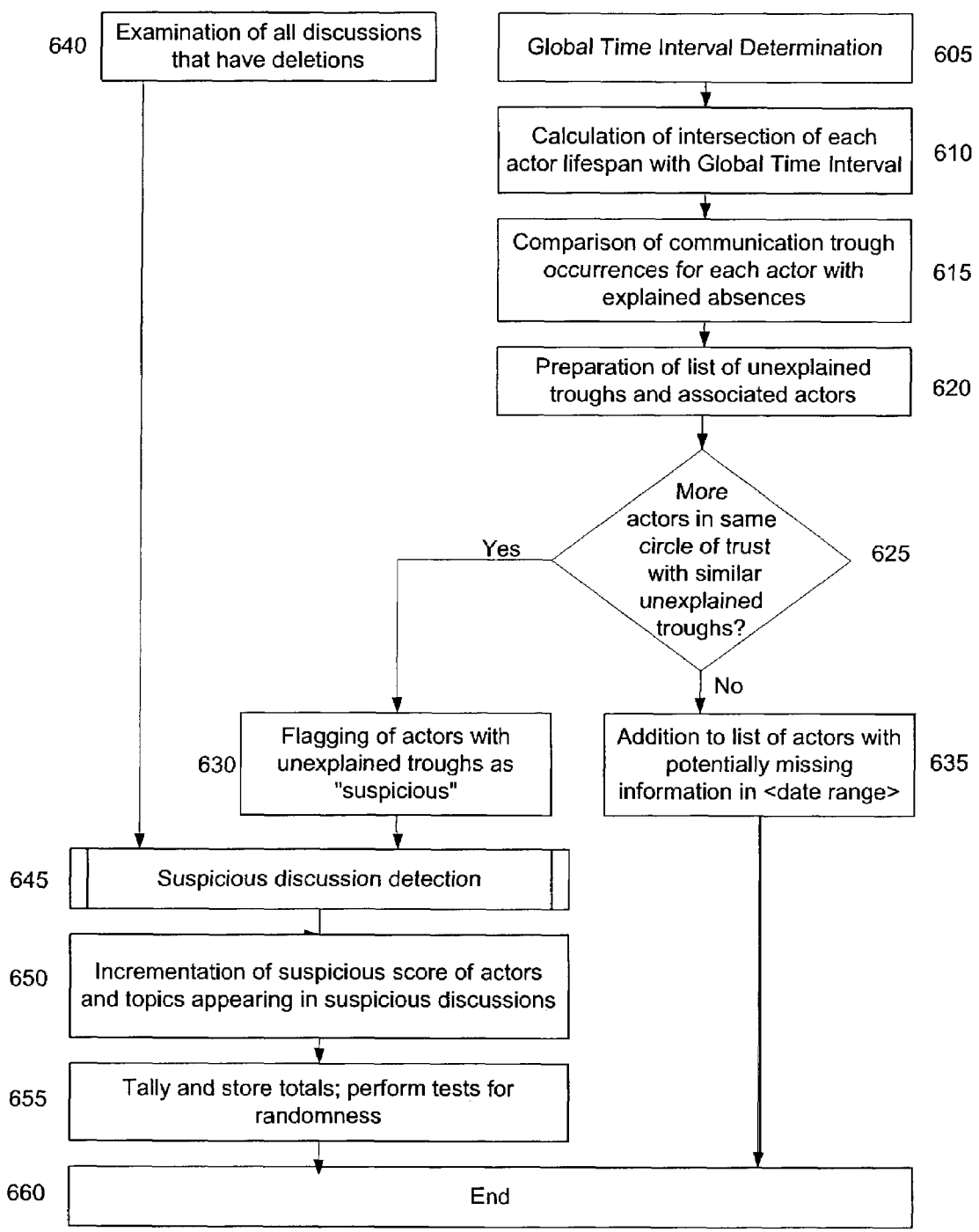

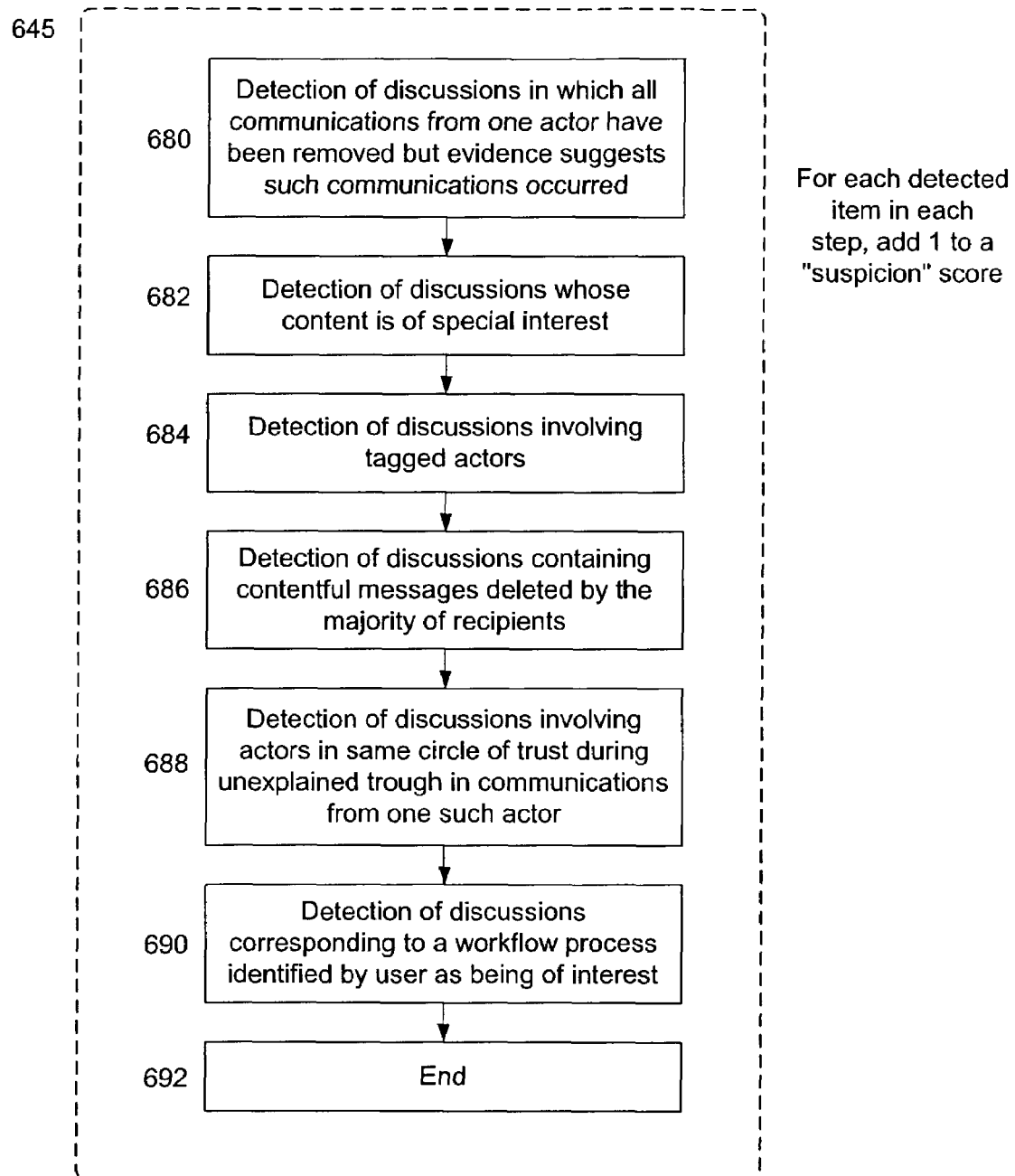

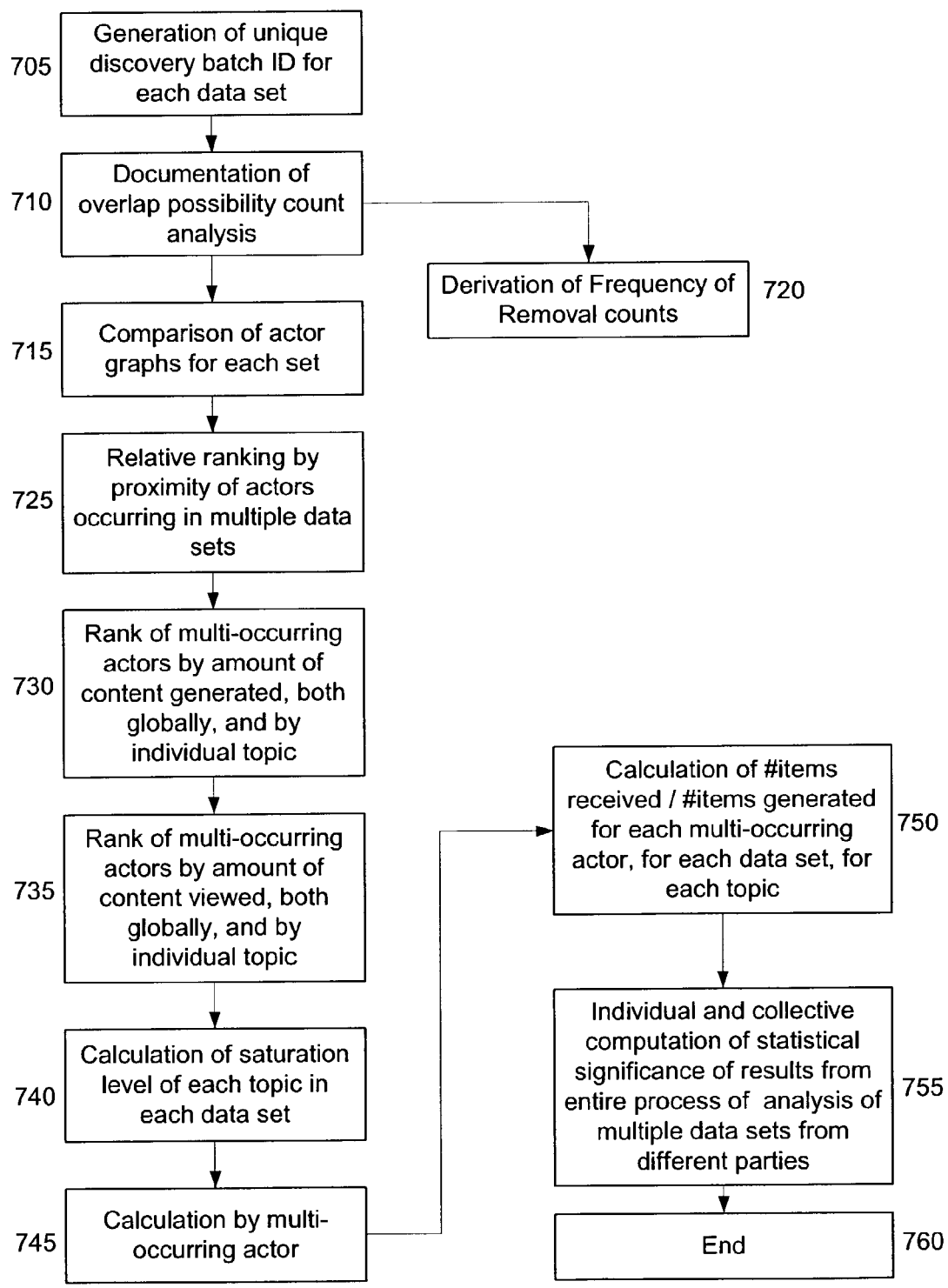
Figure 7: Analysis of multiple data sets from different parties

DATA MINING BY RETRIEVING CAUSALLY-RELATED DOCUMENTS NOT INDIVIDUALLY SATISFYING SEARCH CRITERIA USED

FIELD OF THE INVENTION

The present invention relates to electronic documents, and more particularly to a process whereby arbitrarily large amounts of electronic information may be automatically winnowed down to only those subsets of particular interest.

BACKGROUND

The volume of electronic information in both personal and corporate data stores is increasing rapidly. Examples of such stores include e-mail messages, word-processed and text documents, contact management tools, and calendars. But the utility, precision and usability of knowledge management and search technology has not kept pace.

The vast majority of searches performed today are still keyword searches or fielded searches. A keyword search involves entering a list of words, which are likely to be contained within the body of the document for which the user is searching. A fielded search involves locating documents using lexical strings that have been deliberately placed within the document (usually at the top) with the purpose of facilitating document retrieval. These data retrieval techniques suffer from two fundamental flaws. Firstly, they often result in either vast numbers of documents being returned, or, if too many keywords or attribute-value pairs are specified and the user specifies that they must all appear in the document, no documents at all. Secondly, these techniques are able only to retrieve documents that individually meet the search criteria. If two or more related (but distinct) documents meet the search criteria only when considered as a combined unit, these documents will not be retrieved. Examples of this would include the case where the earlier draft of a document contains a keyword, but where this keyword is absent from a later version of the same document; or an e-mail message and an entry in an electronic calendar, where the calendar entry might clarify the context of a reference in the e-mail message.

Additionally, the user often requires detailed prior knowledge (before running the search) of keywords likely to occur in any sought-after documents, or even such details as the exact date (or range of dates) on which a message was sent, or who sent it.

SUMMARY OF THE INVENTION

This patent describes a method and apparatus to automatically and accurately winnow down arbitrarily large amounts of electronic information created by a particular population of actors to only those subsets of particular interest. An actor in this context is defined as any entity, single or aggregate, capable of creating, distributing, modifying, or receiving digital information. Once identified, this subset of information may, for example, be processed, analyzed, redacted, or destroyed, depending on the context of the system's use.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of one embodiment of a network on which the present invention may be implemented.

FIG. 2 is a block diagram of a computer system that may be used with the present invention.

FIG. 3 is a block diagram of one embodiment of the discussion building engine.

FIG. 4 is a flowchart of one embodiment of creating the discussion trails of the present invention.

FIG. 5 illustrates one example of an initial actor graph.

FIG. 6a is a flowchart of one embodiment of evaluating suspiciousness in a data set.

FIG. 6b is a flowchart of one embodiment of the suspicious discussion detection process.

FIG. 7 is a flowchart of one embodiment of analysis of multiple data sets from multiple sources.

DETAILED DESCRIPTION

There is a clear need for a search technique that returns sets of related documents that are not merely grouped by textual similarity, but also grouped and sequenced according to the social context in which they were created, modified, or quoted.

The present system makes it possible to retrieve a very precise set of documents from a large corpus of data. Hitherto, with conventional search tools, even with the use of complex search queries, results have been restricted to documents that individually meet the search criteria. It is desirable to be able to retrieve a precise set of documents from a large corpus of texts using relatively simple search queries. It would be of further benefit to present documents in the context of causally related information (for example, a document containing the minutes of a board meeting has a causal link to an email announcing that meeting), even when those other documents do not, individually, satisfy the search criteria. Examples of causally linked documents include, but are not limited to: an e-mail message expressing the need to create a particular document, and the document that is consequently created; a calendar entry for a meeting, the minutes of that meeting, and a document that is created or modified in response to an action item at that meeting; a letter of resignation and the personnel records showing the date on which someone left a company; and the filing of a purchase request and the approval of it.

Possible applications of the present invention include (but are not limited to) author identification, auditing of financial data or of processes (such as processes subject to regulatory compliance), criminal or civil investigations, document management and retention policy implementation (to seek and destroy documents that can safely be eliminated), documenting intellectual property (for example, to show that one company had an intellectual property breakthrough before another), project management post-mortems, information flow tracing (examples include, but are not limited to, first-mention detection, and information leak detection), and detection of suspicious deletion or alteration of documents (examples include, but are not limited to, civil and criminal investigations, and investigations pursuant to the Sarbanes-Oxley Act of 2002).

The process takes as input an arbitrary number of electronic documents, either in their native electronic format, or processed, for example using optical character recognition (OCR) or voice-to-data conversion. As output it produces one or more of the following:

"Discussions," or electronic paper trails which represent sets of documents that have a very probable causal relationship to one another.

A set of documents that is relevant to a specific population, and a set that, while being present in the corpus, is foreign and hence irrelevant (for example, unsolicited e-mail commonly known as "spam".)

Categorizations of documents based on topic.

Statistical profiles of arbitrary subsets of these documents.

Subsets of documents to be subjected to special processing (for example, privileged documents)

Communications profiles for each actor identified by the system.

Textblocks, or subdocuments; a block of text in a document attributable to a particular actor.

Optionally, this process may output automatically redacted documents based on user specifications of what material is to be redacted in whatever context it should appear. Redaction is defined as the removal, obliteration or obscuring of part of a document, as distinct from the whole document.

The process has the following main steps:

Removal of irrelevant data such as operating system files and common software applications, should they be present.

Construction of an actor graph. This is a graph linking all actors discovered by the system based on the number of times and different ways in which they have communicated with one another. One embodiment of constructing an actor graph is discussed in copending application Ser. No. 10/358,786, entitled "A Method and Apparatus to Visually Present Discussions for Data Mining Purposes", filed concurrently herewith (hereinafter referred to as "Sociological Context Engine").

On the basis of the actor graph, probabilistic disambiguation of OCRed text if present, or of ambiguous actor references generally.

Binning of the data into discussions. One embodiment of the mechanism by which discussions are constructed is explained in detail in the Sociological Context Engine application.

Removal of data outside any specified date range (if applicable,) and common listservs, spam, etc, as well as duplicate data.

This process results in one copy of each distinct relevant document, despite the fact that many copies of individual textblocks may have propagated (one example of this is portions of an email message that become duplicated by being quoted in subsequent replies to that message). The system may further perform the following steps:

Filtering all the documents through the different ontologies in order to identify specific topical content, and noting the intersections Identifying actors or personalities that generated or received content related to any of the ontologies of interest to the user, and filtering again. Actors and personalities identified in this way will be referred to here as "tagged".

Checking the integrity of the data on the basis of discussions, and statistical patterns of actor behavior as well as checking that actor activity corresponds to what the records in a Human Resources or security database indicate (in those cases where such information is available.)

Identifying all textblocks that are "hit" (matched) by specific ontologies, and which optionally are attributable to a particular actor.

Optionally removing or redacting such textblocks and any trailing elliptical references.

Profiling production sets in this manner in order to determine differences of interest, such as systematic removal of certain kinds of content. This information can then be used in order to determine whether a party complied fully with a subpoena, appears to have illegally deleted data that they had a legal obligation to preserve, or similar determinations.

As noted in FIG. 4 below, some of these steps cause the revisiting and possible correction of the output from previous steps. Note that the process herein described could be used in a continuous system that is updated incrementally from an incoming data stream that is continuously monitored and analyzed as more data becomes available.

FIG. 1 depicts a typical networked environment in which the present invention operates. The network 105 allows access to email data stores on an email server 120, log files stored on a voicemail server 125, documents stored on a data server 130, and data stored in databases 140 and 145. These documents are made available to the present system. As will be described in more detail below, for one embodiment, the data is first indexed. For one embodiment, the sociological context system 135 removes all non-relevant items (e.g. non-documents, such as system files) that are retrieved. The sociological context system 135 then processes the data, as will be described below, to produce a set of documents that are grouped by social context. Visualization mechanism 110 presents the resulting "discussion" in a visual manner to the user. This "discussion" can then be used for various purposes, as described above.

FIG. 2 is one embodiment of a computer system 200 that may be used with the present invention. It will be apparent to those of ordinary skill in the art, however that other alternative systems of various system architectures may also be used.

The data processing system illustrated in FIG. 2 includes a bus or other internal communication means 215 for communicating information, and a processor 210 coupled to the bus 215 for processing information. The system further comprises a random access memory (RAM) or other volatile storage device 250 (referred to as memory), coupled to bus 215 for storing information and instructions to be executed by processor 210. Main memory 250 also may be used for storing temporary variables or other intermediate information during execution of instructions by processor 210. The system also comprises a read only memory (ROM) and/or static storage device 220 coupled to bus 215 for storing static information and instructions for processor 210, and a data storage device 225 such as a magnetic disk or optical disk and its corresponding disk drive. Data storage device 225 is coupled to bus 215 for storing information and instructions.

The system may further be coupled to a display device 270, such as a cathode ray tube (CRT) or a liquid crystal display (LCD) coupled to bus 215 through bus 265 for displaying information to a computer user. An alphanumeric input device 275, including alphanumeric and other keys, may also be coupled to bus 215 through bus 265 for communicating information and command selections to processor 210. An additional user input device is cursor control device 280, such as a mouse, a trackball, stylus, or cursor direction keys coupled to bus 215 through bus 265 for communicating direction information and command selections to processor 210, and for controlling cursor movement on display device 270.

Another device, which may optionally be coupled to computer system 200, is a communication device 245 for accessing other nodes of a distributed system via a network. The communication device 245 may include any of a number of commercially available networking peripheral devices such as those used for coupling to an Ethernet, token ring, Internet, or wide area network. The communication device 245 may further be a null-modem connection, or any other mechanism that provides connectivity between the computer system 200 and the outside world. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 210.

It will be apparent to those of ordinary skill in the art that the system, method, and process described herein can be implemented as software stored in main memory 250 or read only memory 220 and executed by processor 210. This control logic or software may also be resident on an article of manufacture comprising a computer readable medium having computer readable program code embodied therein and being readable by the mass storage device 225 and for causing the processor 210 to operate in accordance with the methods and teachings herein.

The present invention may also be embodied in a handheld or portable device containing a subset of the computer hardware components described above. For example, the handheld device may be configured to contain only the bus 215, the processor 210, and memory 250 and/or data storage device 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 210, a data storage device 225, a bus 215, and memory 250, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 210. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

FIG. 3 is a block diagram of one embodiment of a sociological context system, in accordance with the present invention.

FIG. 4 is a flowchart of one embodiment of the document trail process. The process starts at block 405. Note that prior to starting this process, common files such as those associated with the operating system, are removed via the use of MD5 hashes or other similar methods. For one embodiment, the contents of the electronic files are also indexed using standard indexing methods. For one embodiment, any relevant "documents" or "communications" are further added to the available data. This may be done by converting voicemail messages, letters, faxes, or other non-electronic documents into electronic form. For the purposes of this discussion, the term "document" refers to any communication between actors, whether via mail, email, fax, voicemail, or other retrievable means.

At block 405, the initial actor graph is constructed. FIG. 5 illustrates a simple actor graph, showing communications between three actors. Actor A 510 communicates with Actor B 515, and this is stored in the system as a communications link 550. Actor A 510 also communicates with Actor C 520, and this is stored as a communications link 555. The actors, and their relationships in terms of shared communications, is referred to as the "actor graph."

Returning to FIG. 4, at block 410 each document is passed through the system and its meta-data is extracted. Of special interest at this stage are the actors associated with each document. Actors may be associated with documents in a variety of ways, including but not limited to:

Being the author or an addressee of an email, OCR'ed regular letter, or other document.
Being the author or an addressee of an instant message
Being the author of a document
Being an author of a modification to a document
Being the person who posted a meeting announcement on an online calendar
Being referenced within a document
Being a person—such as an administrative assistant or other co-worker—who ordinarily has access to documents addressed to the addressee of a document.

The first time actor A communicates with actor B, a directional link is drawn in the graph connecting A and B. This is shown as directional link 550 in FIG. 5. Subsequent communications increase by 1 the weight or score of this link. FIG. 5 illustrates a first link 550 being heavier than a second link 555. This indicates that there is more communication between actor A 510 and actor B 515 than between actor A 510 and actor C 520. In one embodiment, different kinds and contexts of communications bestow more weight to the link than others. For example, being in the "To:" line in an email is scored higher than appearing in the "cc:" line. One embodiment of such weighing is discussed in the Sociological Context Engine application.

In practice, this process presents a number of difficulties that may not be immediately apparent upon initial review. For one thing, most real-world corpuses contain large numbers of references to spurious actors. This occurs due to a number of reasons, including many people using the same software application license, or many people reusing the same template document over time. Use of false or joke identities is also a frequent occurrence. Some electronic identities may be aggregate actors, such as group mail aliases. In this first pass, there may not be sufficient information to remove such spurious actors, and they may thus be included in the set of nodes that the system will try to connect together in various graphs. They will be removed or corrected at a later stage when more information is available to root them out. (Different correct electronic identities that correspond to the same human user will be identified by the system on the basis of several techniques including name matching or co-occurrence of identities on the same messages. One embodiment of implementing this process is discussed in detail in the Sociological Context Engine application.

The result of this step is a sparsely connected weighted directed graph, or sets of such graphs. This information allows the computation of the communication distance or proximity between any pair of actors, as well as the probability that a communication involving a particular actor, or tuple of actors also includes some other particular actor(s).

At block 410, ambiguous actor references are disambiguated. Although at this stage in the process, the information in the actor graph is necessarily imperfect, it is of sufficient quality to resolve the majority of ambiguous actor references. In the first phase of processing, ambiguous actor references are flagged in native electronic documents, and are revisited using the process described below. All documents whose content has been captured using imprecise input techniques, such as OCR, are passed through this process due to the possibility of garbled characters altering actor names. Ways that such references can occur include the following:

- As a result of character corruption during the OCR process, a reference to an actor "Patrick Boyle" might become "Patrick Doyle." Both names are plausible looking on their face, and indeed in a large enough actor population, persons with each of these names could very well exist. However, by using the actor graph to calculate a straightforward probability of the co-occurrence of both of these actors with the other actors associated with the document, the correct actor will be identified in the vast majority of cases. After discussions have been built in a subsequent step, these disambiguations are revisited with an even finer-grained tool. This will determine, for example, whether either of these actors appeared elsewhere in the same discussion.
- More than one actor in the corpus might have the same, or very similar name. This generally does not trick the actor graph, since it keys on electronic identities such as mail addresses rather than human names, which are not guaranteed to be unique even with respect to a particular corpus. Again, computing a straightforward probability of co-occurrence with the other actors associated with the document will very often yield the correct actor.
- An actor may be referenced within a document by just first or last name. This is resolved in exactly the same way as the other cases.

At block 415, actor graph correction is performed. The above process may result in corrections to the actor graph in any of the following ways:

- A reference to one actor may be replaced with a reference to another, resulting in one link counter being decremented and another being incremented.
- A new reference to an actor may be added, and a spurious actor resulting from a typographical or OCR error may be removed from the graph.
- A potential new actor may be identified on the basis of an incompatibility between likely name resolutions and actors who would have been at all probable to occur in a particular context. This causes the creation of a new node in the graph.

At block 420, discussion building is performed. The first few steps of the process are concerned primarily with identifying different actors and connecting them together. Discussion building is concerned primarily with connecting together different documents and events. This is done according to a process which consists of different methods of accruing evidence of probable causality between documents across a number of dimensions. The dimensions include, but are not limited to:

Actors

Time

Metadata such as "Reply to" or "Forward" headers (in the case of email), whether automatically or manually assigned.

Presence of same attachment

Sequential elements in a workflow process

Document or event type (for example, spreadsheet, a check-in message, a scheduled meeting, etc)

Document topic (as determined by applying various ontologies)

Document textblock content

One example of doing this is described in the Sociological Context Engine application. An overview of this process is presented here in FIG. 3. The corpus of data is indexed (where data has already been indexed, the indexes are brought up to date, if necessary) (Blocks 305, 310, 315). After post-processing (Block 320), actors, workflows and events are identified (Blocks 325, 330, 335). Document lineage assessment and linguistic analysis are performed (Blocks 340, 345), and discussions are built (Block 350). After anomalous patterns, where present, have been detected (Block 355), all data is committed to the data store (Block 360). The process is repeated incrementally as new data is provided (Block 365). The result of this process is that many documents, and events, (for example, meetings scheduled in on-line calendars) will be sorted into one or more discussions. Documents that are singletons, and appear to have nothing connected with them, will not be sorted in this way. As noted in a subsequent step, singletons whose authors rarely occur in the corpus and who are never associated with any discussions are very likely spam, or some other type of document that may safely be excluded from analysis on the grounds of irrelevance such as a listserv, electronic newsletter, etc. In one embodiment, communications that occur in the context of a discussion are weighted more highly than those that do not.

Discussion building includes actor textblock attribution, at block 425. One of the pieces of evidence used to assemble discussions is the presence of particular textblocks. A textblock is a sequential set of words that is both long and distinctive enough to be very rarely occurring in the corpus, and is generally unique. A textblock in its initial or earliest calendar occurrence in the corpus is generally attributable to a single actor. For one embodiment, the techniques described in co-pending application Ser. No. 10/358,786 are used for such attribution. However, as the textblock is propagated from document to document, it may be modified by the same author, or by additional authors. Textblocks are of great importance for two reasons: they allow the system to help trace the lineage of specific documents, and even more importantly, the involvement of different actors in them. Without assessing the data at this level, particular statements or ontology hits could be incorrectly associated with the wrong actor.

For example, the statement "I embezzled a million dollars" in a message authored by actor A does not necessarily mean that actor A is the author of that statement; he might have instead originally been the recipient of it. Further, large numbers of incorrect actor attributions could mar the accuracy of any of the methods used to lexically "fingerprint" individual actors.

In the case of most document types, the graph-corrected actor is generally assumed to be the author of all of the text contained in the document, except in situations where there is specific evidence to the contrary. Examples of such evidence can include:

Where a change tracking mechanism indicates that a different author was responsible for a specific change.

Where a source control or repository system check-in message similarly indicates that a different author had made changes to the document. The document may then be placed into a "diff" program in order to determine the exact changes made.

Where an email has been replied to or forwarded, perhaps repeatedly, placing copies or partial copies of preceding messages into each subsequent message.

Where a substantial textblock that had been previously attributed to a different actor appears in a document with an author other than the actor associated with the authorship of the document.

At block 430, actor communication profiles are updated. Each node in the actor graph has a communication profile associated with it. The information is used largely in order to determine "normal" communication behavior for that individual, as well as to be able to lexically "fingerprint" individual actors based on idiosyncrasies in how they use words and phrases, and even make spelling and punctuation mistakes. Since prior to the previous step, some text may have been implicitly attributed to different actors incorrectly (for example, when the meta-data extraction was performed by an indexer prior to the start of Step 1), the necessary adjustments are made at this point, and any identified incorrect author assignments are replaced with the corrected ones. This can be thought of conceptually as having a separate index of the text attributable to each actor.

At this stage, the system has a highly accurate list of every actor that has participated in a discussion during the time interval for which information is available. Further, the available information in terms of each actor's communication styles and behaviors has been analyzed. At this juncture, any material that is deemed irrelevant can be removed from the data set. For example, subpoenas are limited to a particular date range; material created before or after these dates are not at issue for the subpoena, and were merely examined by the system for modeling purposes. Discussions which lie partially inside the time interval of interest, and partially outside it, remain in the data set, for one embodiment. For one embodiment, such discussions may be automatically truncated with a single command. Similarly, discussions or documents on particular topics may be removed at this juncture. Further, any actors external to the primary network domain(s) in the corpus who have only sent rather than received communications, may now be safely removed as being either spam, or possibly online newsletters, or other "foreign" material. In some embodiments of the invention, such removal is done iteratively, starting from the stage at which an actor graph is first constructed, and it is observed that such actors have no bi-directional links associated with them.

After as many documents as possible have been initially binned into discussions, and a reasonable amount of actor-related information has been corrected, the system attempts to assign topics to them by applying different hierarchical ontologies, at block 440. Categorizing documents by ontologies is a well-known technique. However, the system is applying ontologies to whole discussions, rather than just individual documents. This enables the correct categorization of short-content items and events that would not otherwise be possible. For example, a discussion might start out with a message containing an explanation of a particular tax scam, but all of the subsequent messages might be brief and highly ambiguous, and might very well not contain any stems that would trigger any of the ontologies. Finally, the discussion might end with a scheduled meeting of all of the discussion participants. Being able to count each of these items as associated with an ontology relating to potentially illegal tax activity gives a much more accurate picture of both the amount of discussion on the topic, and the extent of the involvement of different actors in it.

At block 445, tagged actors (as defined above) are identified. The information from the preceding steps is used to ascertain which actors are discussing which topics, both in an initiating situation and in a responding one. "Did someone say X" or "Did someone see X" are two very different questions, and the system's ability to correctly attribute textblocks to their authors allows them to be treated differently. Since the system sequentially labels textblocks in each document, a textblock created by author B that immediately follows a textblock containing certain content can reasonably be considered evidence that author B saw the preceding content.

Certain ontologies may correspond to content that would generally be considered of a damaging nature (either damaging in a specific context, or more generally,) and it is very useful to be able to identify and tag the actors that have discussed such content, especially those who initiated it. The system has by default a set of ontologies which are considered damaging. However, the user may assign the "damaging" attribute to any ontology, or remove it. Thus the system tabulates which actors have authored or seen text that was trapped by each ontology. Once an actor is found to have participated in the creation of damaging content, any communications they authored are passed through the system a second time, this time requiring a much lower threshold for a communication to be considered potentially damaging. In one embodiment of the invention, by default, the occurrence of even a single piece of damaging evidence, such as a particular word or term, causes the entire item to be categorized as damaging. This information can be used to prioritize documents for manual review, or to redact or destroy the information, depending on the context of use. Similar processing may be applied to identification and treatment of discussions relating to other kinds of tagged actors.

At block 450, the actor profiles are updated with the new information of which topics each actor discussed, and with whom. The actor graph may also be modified at this step. An unknown actor's participation in the discussion of very specific, generally restricted topics may help provide the evidence (along with lexical fingerprinting) to strongly suggest that the "unknown" actor is in fact a particular known actor using a previously unknown electronic identity.

At block 455, the data furnished by the ontologies is also used to modify discussion structure in any of the following ways:

To include data in a discussion based on the additional evidence supplied by the ontology that the new data is on the same topic as other time-contiguous items in the discussion.

To segment long discussions into partitions based on topic drift Both these topics are discussed in detail in the Sociological Context Engine application.

At block 460, a data integrity check is performed. While in the course of normal events many documents will be deleted for one innocuous reason or another, under some circumstances the systematic or deliberate deletion of certain kinds of documents may be illegal. Conversely, in responding to a subpoena, for example, all documents meeting certain qualifications specified in the subpoena must be placed into a production set that is handed over to the other side. That is, the non-inclusion of certain documents in the production set is illegal. In either case, there is a set of data that the system can evaluate with the goal of determining its likely completeness and correctness. Similar requirements are found in other situations, including audits, investigations, and regulatory compliance. FIG. 6a is a flowchart of one embodiment of the suspicious document detection process.

For one embodiment, there is presumed to be a fixed interval of time bounding the analysis, even if the endpoint is the present day. The starting date is either specified by the user, or derived from the indigenous document with the earliest date stamp (Block 605). The term indigenous refers to documents with an author that is a member of the actor population, and which do not correspond to a well-known file such as those associated with the operating system, which are removed by means of MD5 hashes or a similar method, as discussed above. An ending date is user-specified, defaults to the present day, or defaults to the latest date stamp on an indigenous file.

Each node in the actor graph has a lifespan associated with it. The lifespan documents the earliest, and latest electronic appearance of that actor in the population. An appearance can be any number of things, including an entry in an HR system, an initial email being sent, or a reference in an indigenous document. The intersection of the time interval for analysis and each actor lifespan is computed (Block 610); not every actor may have been present in the corpus throughout the entire time interval (Block 615). For each actor, or alternately each actor designated by the user, the system generates a histogram of the communications history of that actor. For one embodiment, the histogram may be per week, per month, or per another time unit specified by the user. Specifically, these are any instances in which either the creation of any kind of document (including emails or instant messages) or the creation or modification of a textblock was initiated by that actor. If the histogram has a value of zero for two weeks or more after the start of the actor's lifespan and before its end, this is flagged as anomalous by the system. In another embodiment, the user may specify the length of an abnormal absence interval, either by providing a fixed interval length, or an actor-relative formula for calculating it. The system builds a list of such occurrences (Block 620). It then retrieves any HR records or calendars that are available for the actors in question in order to determine whether a vacation or other absence could have been responsible for the trough in communications. In those instances where there is either an exact match of the date range of a recorded absence, or substantial overlap with it, the actor is removed from the potentially anomalous set (Block 620).

Next the system compares the list of anomalous actors to the actor "circles of trust" (Block 625). A circle of trust is a set of actors who consistently correspond in a closed loop with one another. One embodiment of the generation of such circles of trust is described in the Sociological Context Engine application. The appearance of more than one actor from the same circle of trust in the anomaly list is flagged by the system as highly suspicious (Block 630), since it may suggest that discussions among certain sets of actors are being systematically deleted, or that certain media have been misplaced or lost. If no other actors from the same circle of trust have similar unexplained troughs in communication (Block 625), the system flags the actor with unexplained troughs and adds this actor to the list of actors with potentially missing information in the date range under consideration (Block 635).

In the next pass, the system looks for both discussions with a high percentage of "missing" items or deletions (Block 640). These are items that were either fully or partially reconstructed by the system, but which no longer exist as independent objects. For example, message B, a reply to message A, might contain the headers and text associated with message A. In this event, even if message A no longer existed, it could be accurately reconstructed by the system. However, if all that remained of message A was reply-to ID in another message that no longer resolved to an existing message, message A would not be reconstructable even though there is remaining evidence of a missing item. See the Sociological Context Engine application for a broader discussion.

Of the discussions that flagged in this manner, each is correlated to the actors and topics as determined by the application of ontologies. In one embodiment, this may also be accomplished via the use of other techniques such as clustering. Since electronic documents are deleted as part of everyday events, the fact by itself that these discussions are missing some of their items is insufficient to flag them as suspicious. However, the system will flag as suspicious, during the suspicious discussion detection 645 process, those discussions within this set that test positive during any of the following stages of processing, as shown in FIG. 6b:

Detection of discussions in which all communications from one actor have been removed, but evidence suggests such communications occurred 680. Examples of said evidence would include, but are not be limited to, a reply to a mail from that actor.

Detection of discussions whose content is of special interest 682. In said discussions, content corresponds to ontologies that have been deemed either "damaging" or of special interest, by either the system defaults, or the user.

Detection of discussions involving tagged actors 684, if any.

Detection of discussions containing contentful messages deleted by the majority of recipients 686. Specifically, these are messages with substantial content that do not conform to known templates or pragmatic tags (see the Sociological Context Engine application) that were deleted by all or most of a large number of recipients as well as the sender.

Detection of discussions involving multiple actors during unexplained trough in communications from one said actor 688. In order to be flagged by said detection process 688, discussions must align in time to a statistically significant trough in the communication of anyone of these actors. However, where said trough corresponds to an explained absence, such as a trip, a vacation or a period of leave, discussions are not flagged by said detection process 688.

Detection of discussions corresponding to a workflow process that has been identified by the user as being of interest 690.

In those cases where the corpus contains a number of incremental back-up tapes or other media, bulk deletions between sequential backups can be easily noted. This can be done by using the above-described techniques to compare different data sets, although there may not be a need for separate batch numbers. However, in some embodiments of the invention, each sequential pair of backups is examined, and all documents appearing in the Nth, but not the (N+1)th backup are identified and placed in a special set. A clustering analysis is then performed, and if the deletion set corresponds to a cluster, a suspect deletion warning is triggered. Similarly, a clustering analysis is performed on all of the deletion sets that can be created in this manner. Note that deletions are an event type, and any deletions identified by the above process will be considered bulk deletions, a subclass of deletion.

The subset of discussions that is flagged as suspicious as the result of one or more of these filters is again correlated to both actor and topic in order to help observe whether the deletions seem to be grouped around a particular actor, set of actors, or topic.

It is important to note that the above techniques may also be used in reverse. For example, the system can be used to flag discussions containing items that are about to be handed over in a production set even though some of its items have been marked as either containing "damaging" content or involving an actor who has been tagged as "damaging".

Returning to FIG. 4, the process may terminate at this point. However, for some applications, additional processing may be useful, as described with respect to blocks 465 through 475, below.

At block 465, textblock analysis is performed. This may lead to redaction, at block 470 and/or the building of data set profiles, at block 475.

At block 470, redaction is performed. In certain situations, the redaction or outright removal of all instances of certain textblocks and any referents to them is highly desirable or necessary. "Redaction" refers to the practice of replacing text with an indicator that text has been removed, such as rows of colored squares whose effect on an electronic document is analogous to that of redaction tape in the case of physical documents.

In the simplest case, taking one or both of a list of actor names or ontologies as input, the system redacts or removes both the textblocks that are attributed to the actors in question on the desired topics and any immediately following textblocks which have any of the following properties:

It is attributed to a different actor other than the author of the preceding textblock and it is very short—one sentence or less in length Once the stems that triggered the ontology on the prior textblock have been removed from it, if it is a near match with the following textblock.

Note that the redaction is performed by the removal of the character span to be redacted, and the subsequent replacement of block characters in their place. In the case of complex document types that may retain change history, for one embodiment, the non-redacted content is placed into a fresh document instance prior to the block characters being added.

This results in not only the removal of the offending text, but also in the removal of hints nearby. In the case where the objective is complete removal rather than redaction, the goal would be to surgically remove text including indications of its former presence and make the removal difficult or impossible to notice.

The less simple case is one in which the redaction (or removal) must be balanced by an obligation to preserve specific kinds of information. This must necessarily done on a sentence by sentence basis for each textblock which manifests evidence of both text which one desires to remove, as well as evidence of text that one is required to keep. If tagger analysis determines the presence of more than one non-subordinate clause noun verb phrase, the system will divide the run-on sentence into two or more sentences. In one embodiment, the split is made after the end of the first noun-verb phrase. For one embodiment, if a single sentence manifests both data that must be kept and destroyed, the sentence is flagged for human review. Analysis of trailing or referent textblocks is done the same way as described above; appropriate material trailing text that must be kept will be kept unless it contains text of the "must delete" type. In this event, the text is flagged for manual review.

In one embodiment, the system generates a log of all text that is redacted or removed, as well as a reason code consisting of whether the text was redacted/removed on the basis of a specific actor, one or more specific ontologies, or as trailing content. It also generates statistics on what percentage of each actor's attributable text was removed/redacted, what percentage of this text on particular topics was removed/redacted, and what percentage of all references to these topics was removed/redacted. Similarly, it keeps logs of all instances of text that must be kept, and, consequently, which text was retained, despite having certain characteristics that would support its removal.

As noted above, data sets may be incomplete in various ways. Block 460 describes a process for taking an individual data set, and gauging its level of completeness. This step is performed only when there are multiple related data sets to analyze. Examples of such related data sets exist in the following kinds of situations:

The data handed over as a result of an initial subpoena versus second and third requests for data. Or data that is handed over later than other material, regardless of the reason.

Partially overlapping data handed over from various different parties to a lawsuit.

Data sets from different parallel parts of an organization to compare or measure the processes used.

A more current data set versus an older data set that exists on back-up tapes

The building of such data set profiles, shown as block 475, leverages the new information provided by having additional data available in order to determine any suspicious anomalies in the data.

FIG. 7 is a flowchart of one embodiment of the analysis of multiple data sets from multiple sources. The process starts with each item being given a unique discovery batch ID (Block 705). In one embodiment, the discovery batch ID is generated by concatenating the name of the party providing the data and the date at which it was first provided for analysis. Two different kinds of analysis are then performed, as appropriate.

To the extent that the data sets overlap in time and by actor, it is very possible for the same document to be produced in more than one data set. The number of times this occurs is counted, as is the number of documents that had the opportunity to overlap (Block 710)—for example, were in the timeframe covered by more than one data set—but which were not present in one or more of the data sets. This information is presented to the user by data set. Note that in one embodiment of the invention, the following analysis is performed only on "contentful" documents.

Of those documents that did not appear in all of the data sets in which it was feasible for it to appear, a frequency count is performed of how many times it was removed in each data set. For example, if an email was sent by an actor working for Company X to 4 of his co-workers, 5 people at Company Y and 2 people at Company Z, and there is only one copy of it in the data set provided by Company X and one in Company Y's, that would mean that it had been deleted 4/5 times at Company X, and 4/5 times at Company Y, but no times at Company Z. Note that this last analysis does not apply if deduping, the deletion of duplicate copies of documents, has been performed on the data prior to its inclusion in the data set.

Next, the set of overlapping documents, and the set of documents occurring in each data set are analyzed pairwise on the basis of on both actor and topic occurrence, as well as the cross-product of actor and topic occurrence. Specifically this includes, but is not limited to, the following:

Calculating actor graphs on the basis of the data provided (Block 715), including circles of trust (see the Sociological Context Engine application.)

Relative ranking by proximity of actors occurring in multiple data sets. This entails (Block 725). The idea here is that if such deletions that occurred were random or normal, the relative pattern of activity among actors should remain approximately the same. Hence, a comparison of local portions of the actor graphs corresponding to each data set should yield proportionally similar results for actors appearing across the different data sets. Proximity, or communication proximity, is in some embodiments a function of the number of links apart two actors are from one another. In other embodiments, the absolute or relative (to other link weights in the subgraph) weight of the link is taken into account and 1/(link weight) is multiplied by an edge coefficient. In such embodiments, the edge coefficient is 1 if the link connects the two actors, 10 for the next link, continuing to increase by a factor of 10 for each additional link separating the actors. The communication proximity is the sum for all links separating the actors of (1/link weight)*edge coefficient.

Ranking the amount of text attributable to each author on each topic (Block 730).

Ranking the amount of text viewed by each actor on each topic (Block 735). (In one embodiment, the system definition of "viewed" requires that the actor took some action as a result, such as replying to an email or that the system sent an automated receipt indicating that the email was opened.)

Calculating the saturation level for each topic as part of all content (Block 740). (This is the percentage of discussions in which this topic appears.)

Calculating the saturation level of each topic for each actor (Block 745)

Determining whether the percentage of material on a particular topic that any particular actor created noticeably shifts relative to the percentage of material on the same topic received by the actor (Block 750).

The statistical significance of results from the entire process of analysis of multiple datasets from multiple parties is then computed, individually and collectively, by actor and topic (Block 755). In the event that only random or "normal" deletions occurred, the above metrics should not noticeably differ from set to set. Similarly, except in the case of very small data sets, the actor graphs created should be a correct subset of the full actor graph for the time period in question. Nor should they differ substantially in the relative weights of the links between actors, within the time period in question.

Note that any of these methods can also be used in the context of determining compliance with either a document preservation policy or a document destruction policy. In the former case, there may be prohibitions on deleting any documents to or from a particular individual or aggregate actors, on various topics, pertaining to certain workflows, containing certain specific phrases, etc. The system can be configured to count how many instances of each category of interest appear to have been deleted if any, and whether the pattern of deletions is at all suspect (Block 720). In the latter case, the converse calculation can be done; the system will flag any remaining instances of categories of documents that should no longer be present.

The approximate shape of a data set can also be modeled with clustering algorithms, where the space dimensions include time, certain key actors, and important ontologies. Note that the clusters are used to approximate the shape of patterns. This is a supervised classification/discovery problem. The points are labeled by their group and after the clustering process there can be many more clusters than groups. If the resulting clusters tend to be homogenous in terms of group memberships and dense in space then a trend has been identified. For example, this might indicate that a certain party did not turn over any material involving a key actor after a certain date.

In one embodiment, if additional data is provided by the same party involving the same actors and time span, but in more than one batch, it is handled somewhat differently. Such information is by its nature only additive; it is adding one or more of the following (presuming filtration to remove irrelevant documents):

1. Duplicates or revisions of existing documents
2. Additional similar content from a previously known actor
3. Content from a previously known actor that is dissimilar to what is found in the prior data sets
4. Content from a previously unknown actor that is similar to existing content
5. Content from a previously unknown actor that is dissimilar to existing content Dissimilarity is determined as any of the following:

Substantially modifying the relative weights of the links on the actor graph, apart from the addition of a new actor.

A difference in any of the following:
  Saturation of different topics as part of all content attributable to that author
  Co-occurrence of topics (using standard correlations)
A change in linguistic register for an actor The system flags all documents as one of these five categories, indicating to the user via such means as tables, pie charts, and graphs the relative composition of the data set. It similarly indicates the composition of documents by originating actor, so that any "buried" files from a different actor may be easily spotted. It also matches up tagged actors and ontologies to determine the relative proportions of each in the additional batch sets.

Not all data sets which are related will necessarily contain specifically overlapping material. For example, a first subpoena might subpoena all documents on a particular topic in the year 2000, while a second might do so for the year 2001. In such cases, the system operates under the presumption that while individual document instances change, and possibly individual entities change (for example, an actor may disappear) the overall communication profiles regarding the overlapping actors are likely to remain very similar. In one embodiment, therefore, an analysis will be conducted on the basis of role or job title. So if one actor departs from a particular position during the timeframe in question, and is replaced by another actor, the system will replace the actor appropriately—assuming that such information is available to the system. Note that if HR system information is available, this assumption will be removed for any actor who had changed roles in the organization in the intervening time.

The system allows individual instances of entities such as employees, managers, and customers to be compared across data sets in cases where such a comparison is useful. For example, if one wanted to understand whether a particular matter had been handled according to normally followed or understood procedures, it would be reasonable to compare the colored graphs (see co-pending application Ser. No. 10/358,786, entitled "A Method and Apparatus to Visually Present Discussions for Data Mining Purposes", filed concurrently herewith (hereinafter referred to as "Sociological User Interface") for each group that implemented the procedures. Along similar lines, the correlations of different ontology hits occurring in the same discussions, and among particular actors are also computed by the system.

In a litigation context, the invention can identify and log material that is privileged, and therefore need not be handed over to the other side. Actor extraction from electronic contact lists and similar sources allows doctors, attorneys, and other privileged actors to be identified. This is also done by ontological and pragmatic analysis of the content authored by or sent to or from these individuals, as well as any content created, or modified, by such actors, their signatures (e.g. "esq.") as well as by manually inputting the results of interviewing litigants and others in order to obtain the identities of these actors.

In addition, the present system may be used to identify any documents or earlier versions of documents that were prepared in order to send to a privileged party. This is done in the following ways:

By searching for an appropriate actor reference (e.g. "Dear Dr. Smith) in the document.

By using ontological and pragmatic analysis to identify certain kinds of documents of very specific content, such as a list of symptoms or medications.

Flagging all copies and earlier revisions of any document that was subsequently sent to a privileged actor. In one embodiment, such documents are identified by the document matching algorithms specified in the Sociological Context Engine application.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-aided method of providing analysis in a corpus of documents comprising at least one discussion, the method comprising:

analyzing the discussion to identify a communicative intent of an author of the discussion, including topic, an intended audience, and beginning and ending of a series of communications comprising the discussion even when the retrieved documents do not individually satisfy the search criteria used, the analysis providing a causal relationship between the series of communications.

2. The method of claim 1, wherein the discussion includes a plurality of text blocks, and further comprising:
attributing each of the plurality of text blocks to its respective author.

3. The method of claim 2, further comprising:
identifying potentially damaging content within the discussion, and tagging the author contributing to the potentially damaging content.

4. The method of claim 3, further comprising:
tracking actor communications throughout the corpus of documents in which an actor has contributed to the potentially damaging content.

5. The method of claim 4, wherein the tracking further includes an author who has viewed the potentially damaging content.

6. The method of claim 3, wherein the potentially damaging content is used to identify patterns of behavior.

7. The method of claim 1, further comprising:
evaluating completeness of a corpus of documents, by comparing at least two overlapping datasets; and identifying systematic deletions.

8. The method of claim 7, further comprising:
identifying an actor's lifespan; and
comparing a period of analysis associated with the corpus with the actor's lifespan to identify troughs in the documents when according to the lifespan the actor was present, but no corresponding documents are present in the corpus.

9. The method of claim 1, further comprising identifying content as being of special interest, and flagging a document including the content and an actor that created the content.

10. The method of claim 1, further comprising:
detecting a pattern of communication between actors; and
flagging an unexplained trough in the pattern of communications.

11. The method of claim 1, further comprising:
comparing a list of tagged actors to the actor "circles of trust"; and
detecting and flagging the appearance of more than one actor from the same circle of trust in the tagged list to detect conspiracies and find anomalies such as the systematic deletion of discussions among certain sets of actors.

12. The method of claim 1, wherein the document is captured based on an imprecise input technique, the imprecise input techniques including optical character recognition (OCR).

13. The method of claim 12, further comprising:
generating an actor graph; and
when the system identifies an anomalous name resulting from character corruption during the imprecise input, utilizing the actor graph to evaluate a probability of a match with an existing name.

14. The method of claim 13, further comprising:
removing a spurious actor from the actor graph, when the analysis determines that the spurious actor is a misidentification of another actor, and ensuring that the documents attributed to the spurious actor are reattributed.

15. A computer-aided method comprising:
analyzing a discussion to identify a communicative intent of an author of the discussion, including topic, an intended audience, a beginning, and ending of a series of communications comprising the discussion even when the documents retrieved therefor do not individually satisfy the search criteria used; and determining anomalies in a corpus of documents, wherein the corpus of documents includes multiple data sets from multiple sources, and the anomalies represent substantive differences between the multiple data sets.

16. The method of claim 15, wherein determining anomalies comprises:

analyzing of a set of overlapping documents.

17. The method of claim 16, further comprising:
calculating actor graphs including a circle of trust.

18. The method of claim 17, further comprising:
ranking proximity between actors in the multiple data sets.

19. The method of claim 18, wherein proximity is a function of a number of links two actors are apart from each other.

20. The method of claim 15, further comprising:
determining an amount of text associated with an actor based on topic.

21. The method of claim 20, further comprising:
comparing a percentage of material created by the author to a percentage of the material received by the author on a particular topic.

22. The method of claim 15, further comprising:
identifying overlapping portions of a plurality of data sets; and comparing the overlapping portions of the plurality of data sets to compute a difference between the data sets.

23. The method of claim 22, wherein the difference comprises a degree of absolute and relative difference among the data sets.

24. The method of claim 22, wherein deviation from what is considered customary behavior is examined within a particular given context.

25. The method of claim 22, further comprising:
enabling evaluation of the statistical analysis based on actor and/or topic.

26. A computer-aided method comprising:

analyzing a discussion comprising a plurality of causally related documents to identify a communicative intent of an author of the discussion, including topic, an intended audience, a beginning, and ending of a series of communications comprising the discussion even when the retrieved documents do not individually satisfy the search criteria used; and enabling redaction of a portion of the document, by removing data from a document and replacing the removed data it with data of no value.

27. The method of claim 26, wherein the redaction includes text blocks immediately following, when the immediately following text blocks are no more than one sentence long, when the immediately following text blocks are a near match with the redacted portion of the document, to remove hints regarding the redacted text.

28. The method of claim 26, further comprising:

when the text block includes text to be redacted and text that must be kept, dividing sentences into a plurality of sub-clauses; and separately analyzing each sub-clause and sentence for redaction.

* * * * *

UNITED STATES PATENT AND TRADEMARK OFFICE
CERTIFICATE OF CORRECTION

| | |
|---|---|
| PATENT NO. | : 7,386,439 B1 |
| APPLICATION NO. | : 10/358793 |
| DATED | : June 10, 2008 |
| INVENTOR(S) | : Elizabeth Charnock et al. |

It is certified that error appears in the above-identified patent and that said Letters Patent is hereby corrected as shown below:

Column 1, line 7, insert:

--CROSS REFERENCE TO RELATED APPLICATIONS

This application claims priority from U.S. Provisional Patent Application Serial No. 60/354,403 filed on February 4, 2002 and entitled METHOD AND APPARATUS FOR SOCIOLOGICAL BASED SEARCHING.--

Signed and Sealed this
Nineteenth Day of March, 2013

Teresa Stanek Rea
*Acting Director of the United States Patent and Trademark Office*